United States Patent
Inn et al.

(10) Patent No.: US 7,148,670 B2
(45) Date of Patent: Dec. 12, 2006

(54) DUAL MODE BUCK REGULATOR WITH IMPROVED TRANSITION BETWEEN LDO AND PWM OPERATION

(75) Inventors: Bruce L. Inn, San Jose, CA (US); Ioan Stoichita, Campbell, CA (US)

(73) Assignee: Micrel, Inc., San Jose, CA (US)

( * ) Notice: Subject to any disclaimer, the term of this patent is extended or adjusted under 35 U.S.C. 154(b) by 81 days.

(21) Appl. No.: 11/038,547

(22) Filed: Jan. 18, 2005

(65) Prior Publication Data
US 2006/0158165 A1    Jul. 20, 2006

(51) Int. Cl.
*G05F 1/56*    (2006.01)
(52) U.S. Cl. .................................. 323/283; 323/284
(58) Field of Classification Search ........... 323/224, 323/266, 282–285, 273–279; 363/23, 25, 363/26, 17, 124
See application file for complete search history.

(56) References Cited

U.S. PATENT DOCUMENTS 5,773,966 A    6/1998  Steigerwald
6,724,174 B1 *    4/2004  Esteves et al. .............. 323/224
6,977,492 B1 *    12/2005  Sutardja et al. ............. 323/283

* cited by examiner

Primary Examiner—Rajnikant B. Patel
(74) Attorney, Agent, or Firm—Patent Law Group LLP; Brian D. Ogonowsky

(57) ABSTRACT

A dual mode regulator, having a high current PWM regulator mode and a low current LDO regulator mode, briefly changes the operating parameters of the PWM and LDO regulators during a transition between modes. Changes during the transition period include: raising the error amplifier reference voltage of the LDO or PWM regulator to ensure a definite handover, raising the bias current in the LDO stages during the transition to cause the LDO regulator to quickly and stably respond to voltage glitches, and augmenting the LDO regulator series pass transistors with one or more additional pass transistors during the transition to enable the LDO regulator to handle higher currents. After the transition, the operating parameters of the enabled regulator portion are reset to their nominal values. The PWM regulator is started with a soft start routine to limit current through the power transistor. If the PWM regulator uses a synchronous rectifier, a reverse current limiting circuit is preferably used to limit reverse current when the PWM regulator is starting up to avoid loading down the LDO regulator.

23 Claims, 4 Drawing Sheets

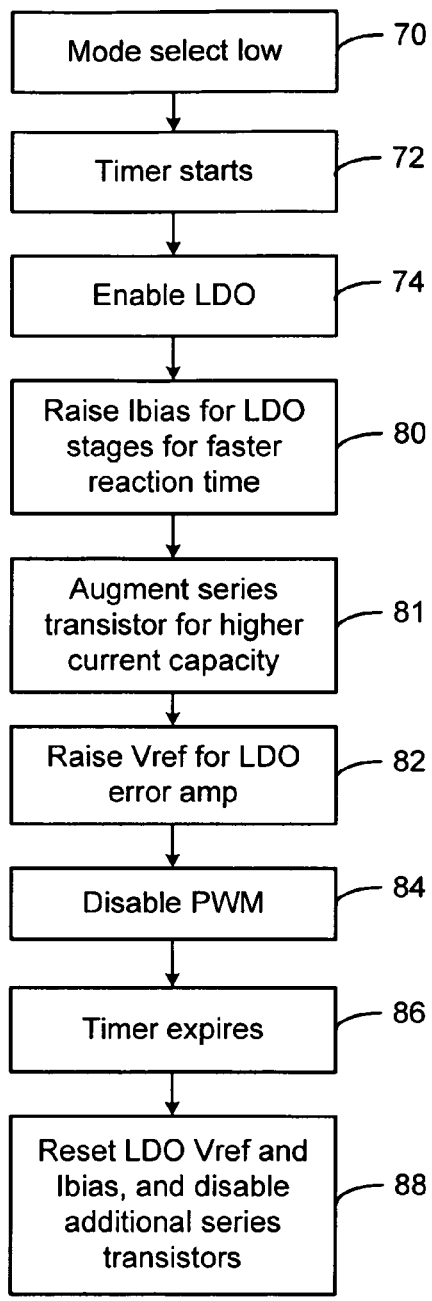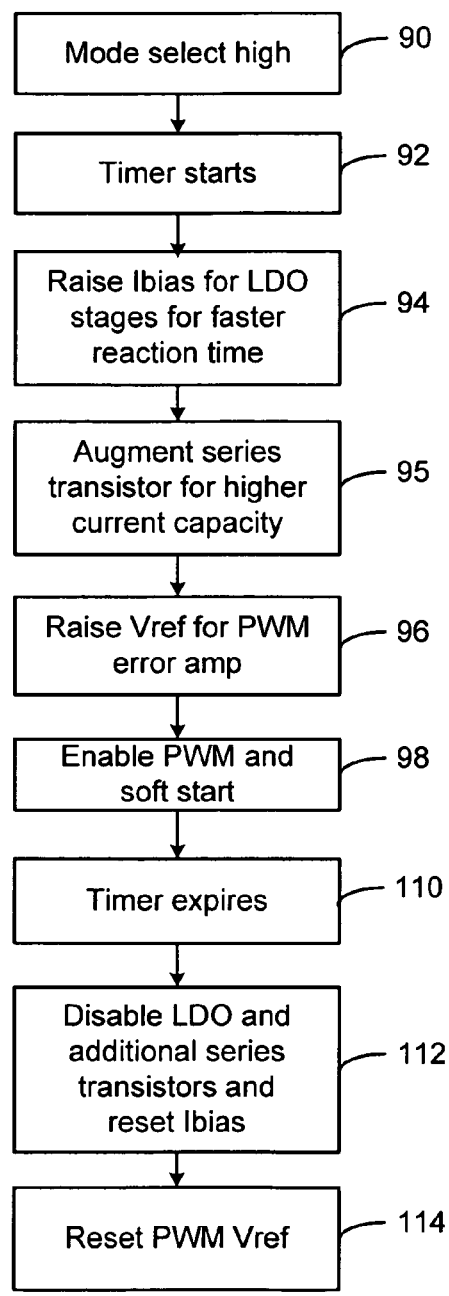
Fig. 6
Fig. 7

DUAL MODE BUCK REGULATOR WITH IMPROVED TRANSITION BETWEEN LDO AND PWM OPERATION

FIELD OF THE INVENTION

This invention relates to voltage regulators and, in particular, to a dual mode regulator that employs a linear regulator mode at low load currents and a pulse width modulation (PWM) mode at higher currents.

BACKGROUND

Dual mode regulators are known that use a linear regulator mode for low currents and a PWM mode for medium and high currents. A PWM regulator switches a power transistor on and off at a regulated duty cycle to maintain a constant voltage at the output of the regulator. The high conductivity of the switching transistor results in low losses across the transistor. This makes the PWM regulator mode efficient for medium to high load currents. At very low currents, although there is low loss across the switching transistor, the losses from turning the transistor on and off at the high switching frequency (typically exceeding 1 MHz) become a significant factor in the regulator's efficiency.

At low currents, a linear regulator, also referred to as a low drop out (LDO) regulator, is more efficient than a PWM regulator because there are no switching losses, and the loss through the series transistor is not very significant at low currents.

In a dual mode regulator, when the load is put into a low current standby mode, for example, the regulator receives a signal initiating the transition between the PWM and LDO regulator modes, and the regulator rapidly changes modes by enabling and disabling the appropriate circuitry. Such a transition causes voltage spikes to appear at the regulator's output unless a large output capacitor is used. Applicants have discovered that the reasons for the voltage glitches include: 1) a poorly controlled handover of the voltage regulation control while one mode is being disabled and the other mode is being enabled; 2) a normally slow reaction time of the LDO regulator and very little current handling capability to handle glitches during the changeover.

SUMMARY

A dual mode regulator is disclosed that briefly changes the operation parameters of the PWM and LDO regulators during a transition period while the regulator is transitioning into a low current mode or a high current mode.

In one embodiment, when the dual mode regulator is transitioning into the low current mode, the LDO regulator is enabled, and the reference voltage for the LDO error amplifier is raised so that the LDO regulator takes over the voltage regulation from the PWM regulator at a definite time to prevent both the LDO and PWM regulators from regulating at the same time. To improve the response time of the LDO regulator to variations in output voltage during the transition period and to temporarily increase its load current capability, the biasing currents in the LDO regulator are temporarily increased to shorten the response time of all pertinent transistors in the LDO regulator, and one or more additional transistors are added to the normal LDO series pass transistor to increase the current handling capability. The PWM regulator is then disabled. After a short period, the parameters of the LDO regulator are reset to their normal optimal values and the additional transistor(s) are decoupled from the series pass transistor.

When the dual mode regulator is transitioning to a high current mode, the biasing currents in the LDO regulator are raised to improve its regulation response time, the series pass transistor is augmented to increase the current handling capability, and the reference voltage for the PWM error amplifier is raised so that the PWM regulator will take over the voltage regulation from the LDO regulator. The PWM regulator is then enabled. The PWM regulator is started with a soft start routine to limit current through the switching transistor. The PWM reference voltage is reset to its nominal value. The LDO regulator is disabled after a short delay, its bias currents are reset, and the additional transistor(s) are decoupled from the series pass transistor.

If the PWM regulator uses a synchronous rectifier, a reverse current limiting circuit is preferably used to limit reverse current when the PWM regulator is starting up to avoid loading down the LDO regulator.

BRIEF DESCRIPTION OF THE DRAWINGS

FIG. 6 is a flowchart of the operation of the transitioning circuits when the dual mode regulator is switched to a low power mode.

FIG. 7 is a flowchart of the operation of the transitioning circuits when the dual mode regulator is switched to a high power mode.

The same or similar elements in the figures are labeled with the same numerals.

DETAILED DESCRIPTION

Figure 1:
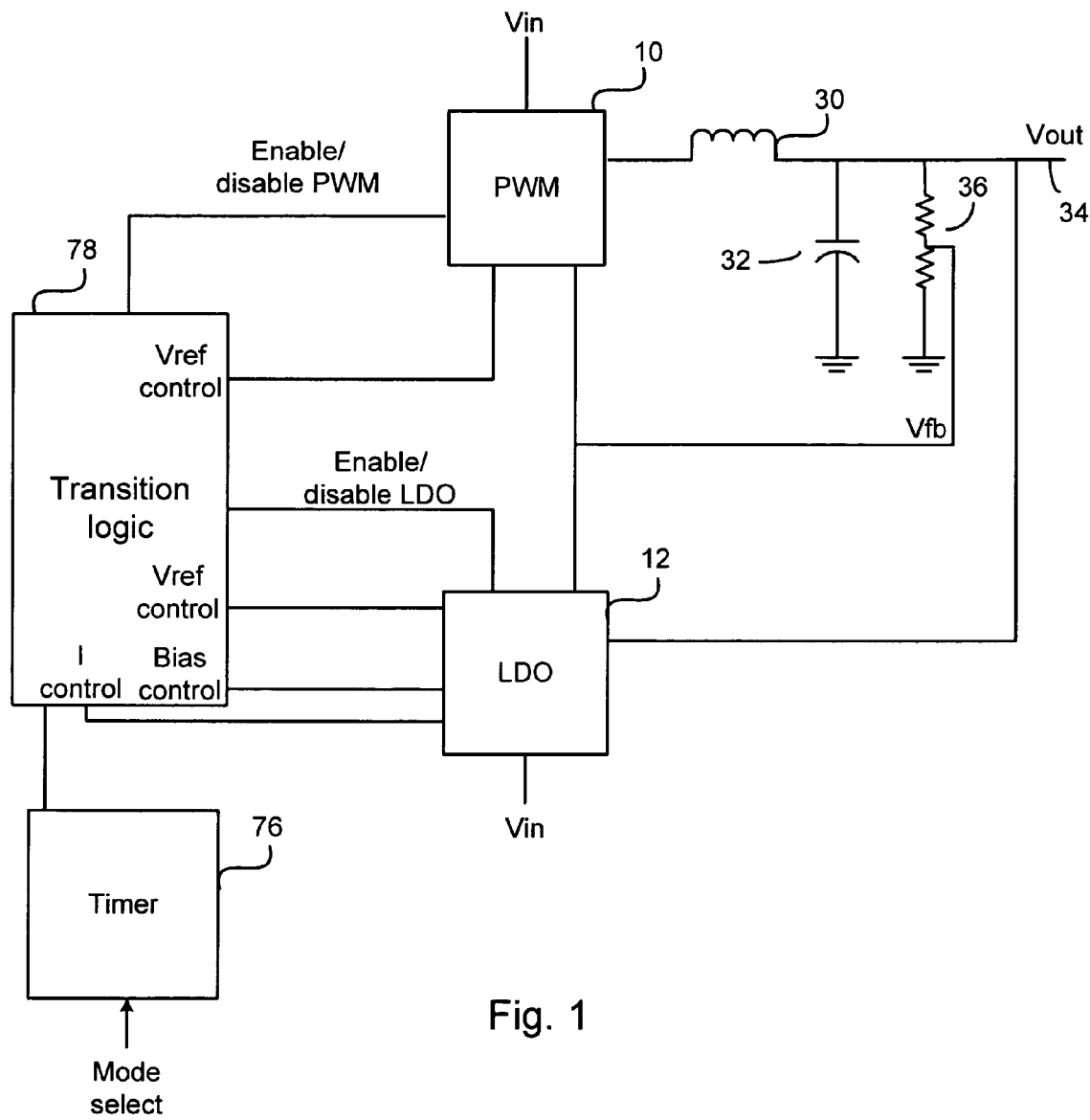
FIG. 1 is a high level schematic diagram of various functional units in a dual mode regulator in accordance with one embodiment of the invention.
Figure 2:
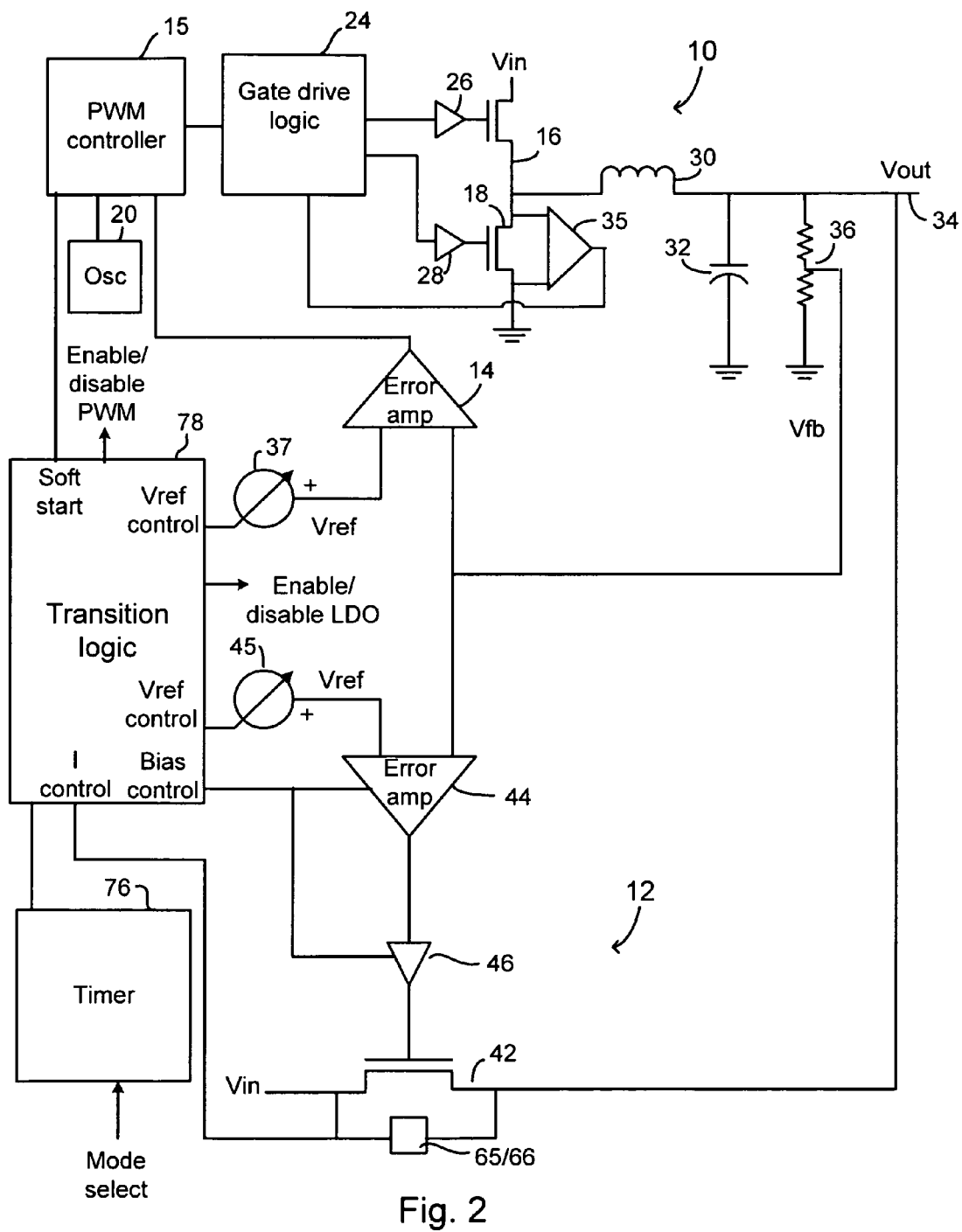
FIG. 2 is a detailed schematic diagram of the dual mode regulator of FIG. 1.

FIG. 1 illustrates one embodiment of the invention, and FIG. 2 illustrates an embodiment in more detail.

An input voltage Vin is applied to the PWM unit 10 and the LDO unit 12. The PWM unit 10 and LDO unit 12 are shown in more detail in FIG. 2. An error signal from an error amplifier 14 is applied to a PWM controller 15 to adjust a switching duty cycle of a power transistor 16. A synchronous rectifier transistor 18 conducts oppositely to the transistor 16 so that there is no direct path the ground. A diode may be used instead of a synchronous rectifier. An oscillator 20 sets the switching frequency for the PWM controller 15. The PWM controller 15 issues switching signals to gate drive logic 24, which ensures that the transistors 16 and 18 alternately conduct. Buffers 26 and 28 provide a suitable current source/sink to the gates of the transistors for a fast response.

An inductor 30 smoothes out the switched current signal and provides a triangular current waveform, the average of which is the current to the load.

An output capacitor 32 smoothes out the triangular current waveform and provides a relatively constant voltage (Vout) at the output 34.

To limit reverse current through the inductor 30 to ground, a reverse current limiting circuit, such as a differential amplifier 35, detects a reversal of current through synchronous rectifier 18 while the synchronous rectifier 18 is conducting and overrides its control signal to shut off the synchronous rectifier 18.

A resistor divider 36 supplies a feedback voltage to the input of the error amplifier 14 (a differential amplifier or other suitable amplifier), and the regulator adjusts the switching duty cycle so that the regulated feedback voltage is equal to the reference voltage (Vref) applied to the other input of the error amplifier 14 by a reference source 37. A compensation capacitor (not shown) is connected to the output of the error amplifier 14 to convert a current source/sink signal into a smoothed error voltage signal.

The PWM controller 15 raises the duty cycle of the power transistor 16 when the output voltage Vout is below the desired voltage and lowers the duty cycle of the power transistor 16 when the output voltage Vout is above the desired voltage. The duty cycle is substantially constant for a given Vin and a desired value of Vout.

The PWM unit 10 may be any type of PWM circuit, including a voltage mode, a current mode, a resonant mode, or other type. The PWM unit may instead be a pulse frequency modulation (PFM) unit or any other type of switching regulator.

In a low load current mode, when the LDO regulator is enabled, the LDO unit 12 varies the conduction of a series transistor 42 connected between the input voltage Vin and the Vout terminal. An error amplifier 44 compares a reference voltage Vref, generated by a reference source 45, to the divided output voltage to generate an error signal. A compensation capacitor (not shown) may be connected to the output of the error amplifier 44. The error signal is received by a buffer 46, which controls the conduction of the series transistor 42. The conduction is increased to raise Vout and decreased to decrease Vout.

Figure 3:
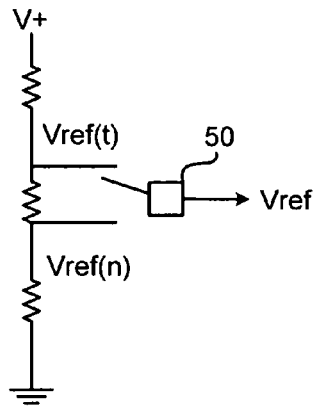
FIG. 3 illustrates one technique for changing the value of the reference voltage.
Figure 4:
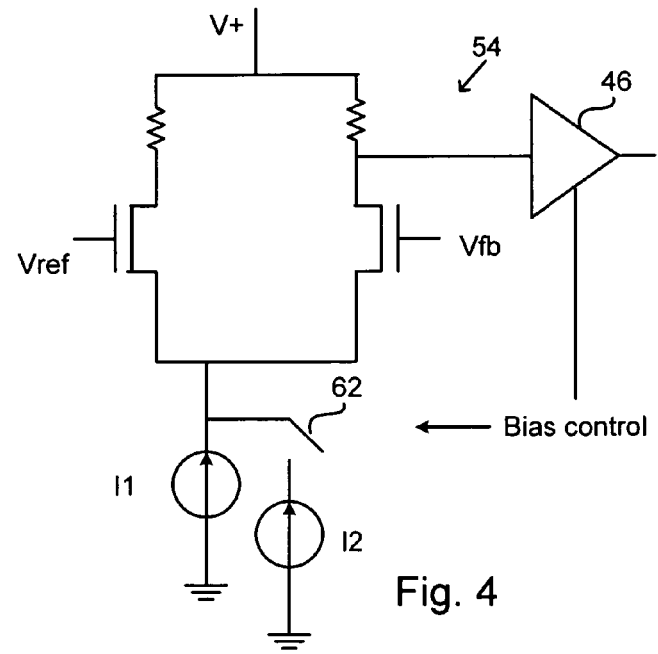
FIG. 4 illustrates one technique for changing the value of a bias current.
Figure 5:
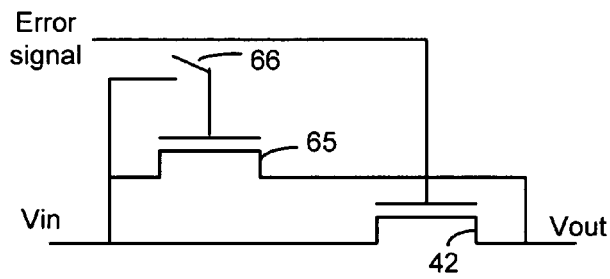
FIG. 5 illustrates one technique for augmenting the series pass transistor.

During a transition between modes, discussed below with reference to FIGS. 6 and 7, reference voltage values are changed, bias currents are changed, and the series transistor is augmented. FIGS. 3–5 illustrate some possible circuits for performing these functions.

FIG. 3 illustrates tapped series resistors used for generating two reference voltages. A fixed voltage V supplies a current through the series resistors. A nominal reference voltage Vref(n) is tapped from the first node, and a higher reference voltage Vref(t) is tapped from the second node. A simple transistor switch 50 is controlled to select the desired reference voltage.

FIG. 4 illustrates a technique for changing bias currents. A differential amplifier 54 may be the error amplifier 44 for the LDO unit 12. The reference voltage Vref is applied to one input, and the feedback voltage Vfb is applied to the other input. The voltage at node 56 is an error signal whose magnitude indicates the mismatch between the reference voltage and the feedback voltage. The magnitude is used to control the duty cycle of the PWM unit 10. The error signal controls the conductivity of transistors in a buffer 60. The output of the buffer 46 is applied to the gate of the LDO regulator series transistor 42 (FIG. 2). Current sources I1 and I2 provide bias currents for the differential amplifier 54. One technique for changing the bias current is to switch in and out the current source I2 by means of a transistor switch 62. By increasing the bias current for the differential amplifier and/or buffer, higher control currents can be applied to the various transistors in the LDO regulator to cause the LDO regulator to react more quickly to regulate the output voltage Vout and remain stable (avoid oscillation).

FIG. 5 illustrates a technique for augmenting the series transistor 42 of FIG. 2 with one or more additional series transistors 65 to increase the current handling capability of the LDO during a transition to quickly compensate for voltage glitches. It is desirable to have a small transistor 42 during low current modes (e.g., 50 mA) to minimize losses from controlling the transistor. However, to quickly correct large voltage glitches, a larger series transistor is needed. By temporarily coupling two or more additional transistors 65 in parallel with the series transistor 42 via a switch 66, such extra current handling capability (e.g., 500 mA) is made available during the transition. When the switch 66 couples the gate of PMOS transistor 65 to the error signal, the transistors' 42/65 conduction is controlled to quickly compensate for any voltage glitch. After the transition period, the gate of the transistor 65 is coupled to its source to turn it off.

FIG. 6 is a flowchart of one embodiment of a technique to provide an improved transition from a high current mode to a low current mode, such as a standby mode. It is assumed that the PWM regulator has been operating normally and the LDO regulator has been disabled.

In step 70, a mode select signal is generated, such as a low signal for entering the low load current mode. The mode select signal may be generated externally such as by a microprocessor that generates a low signal after the powered equipment (e.g., a cell phone) is not used for a period of time. The mode select signal may also be generated by detecting the actual load current (e.g., by detecting the voltage across a series resistor) and comparing the load current to a threshold. When the load current goes below a threshold, the mode select signal will automatically go low. The threshold may have hysteresis to avoid oscillation between modes.

In step 72, a timer 76 issues a PWM-to-LDO transition signal to a transition logic circuit 78. The timer 76 may be a charged capacitor that is discharged at a rate determined by a resistor. The discharging may be by actuation of a transistor switch that is turned on when the mode select signal changes state. The end of the timed period may be the time when a certain capacitor voltage threshold (detected by a comparator) is met. The transition logic circuit 78 may consist of simple circuitry that controls various switches in a particular sequence at particular intervals. Designing such circuitry is well within the skills of those of ordinary skill in the art.

In step 74, concurrently with step 72, the LDO unit 12 is enabled by applying power to the various LDO regulator components, such as the error amplifier 44, voltage reference source 45, and buffer 46. The LDO unit 12 starts up quickly (e.g., 2 micro seconds).

In step 80, the bias levels of all the relevant LDO unit circuits are raised to quicken the regulation response speed of the LDO unit 12. For example, the transition logic circuit 78 closes switch 62 in FIG. 4 and a switch in buffer 46 to increase the current bias. As an example, the Ibias in FIG. 2 may be raised from 8 microamps to 30 microamps. Such an increase in the bias current allows the LDO unit to regulate higher load currents (e.g., max load current raised from 50 mA to 500 mA) without becoming unstable.

In step 81, preferably concurrently with step 80, one or more additional transistors 65 are enabled (or switched in) to augment the series transistor 42 so that the LDO regulator can handle higher currents during the transition.

In step 82, which may be concurrent with step 80, the reference voltage Vref for error amplifier 44 is increased by 2% (or other suitable amount) to cause the LDO unit 12 to immediately take over the voltage regulation from the PWM unit 10. Increasing the reference voltage causes the LDO unit 12 to believe that the output voltage is too low. The LDO unit 12 regulates the output voltage by changing the conductance of the series transistor 42.

In step 84, the PWM unit 12 is disabled by removing power from its various components (e.g., oscillator, buffers, error amplifier, logic, comparators, switching transistors, etc.).

In step 86, the timer 76 expires and issues a signal to the transition logic circuit 78. The timer 76 may set a period on the order of 100 microseconds.

In step 88, transition logic circuit 78 resets the LDO reference voltage and bias levels to their nominal values and disables the additional series transistor(s) 65. At this time, the LDO unit 12 uses very little power, due to the low bias currents, and regulates the output voltage for low current loads (e.g., 50 mA max).

FIG. 7 is a flowchart of the transition technique when the regulator transitions from the LDO regulator mode to the PWM regulator mode.

In step 90, when the powered equipment is to come out of its standby mode, the mode select signal goes high.

In step 92, the timer 76 starts upon receiving the high mode select signal.

In step 94, the bias currents for the various LDO regulator circuits are increased (as before) to shorten the LDO regulator reaction time and allow the LDO regulator to handle the worst case anticipated voltage glitches during the transition and remain stable.

In step 95, preferably concurrently with step 94, one or more additional transistors 65 are enabled (or switched in) to augment the series transistor 42 so that the LDO regulator can handle higher currents during the transition.

In step 96, the reference voltage for the PWM error amplifier 14 is increased by 2% (or other suitable value) to cause the PWM unit 10 to take over regulation from the LDO unit once the PWM unit 10 is enabled.

Figure 8:
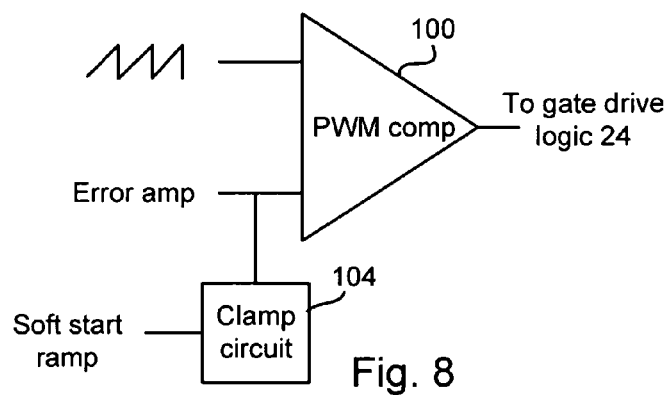
FIG. 8 illustrates one technique for providing a soft start to the PWM unit.

In step 98, the PWM unit 10 is enabled by applying power to the various PWM components. A typical PWM regulator begins regulating on the order of 60 microseconds after being powered up. Since the inductor 30 is completely deenergized at start up, a soft start routine is begun to limit the peak current through the power transistor 16. A soft start routine ramps the duty cycle of the PWM unit 10 until the steady state duty cycle is reached. One simple type of soft start circuit is shown in FIG. 8. The PWM comparator 100 (within the PWM controller 15 in FIG. 2) compares the error voltage to a sawtooth oscillator signal. The power transistor 16 stays on until the sawtooth level crosses the error voltage level. The output of the comparator 100 controls the gate drive logic 24 for turning off the power transistor 16 and turning on the synchronous rectifier 18. The gate drive logic 24 is reset each oscillator cycle, which turns on the power transistor 16 and turns off the synchronous rectifier 18.

A soft start ramped signal is generated upon PWM unit start up, such as from a charging capacitor whose ramped voltage is determined by the size of the capacitor and its charging source. The ramped voltage controls a variable clamping circuit 104 to limit the error signal so that the error signal rises gradually. The clamping circuit 104 forces the duty cycle to increase slowly and linearly until there is no more clamping, at which time the soft start circuit has no further effect. There are various type of soft start circuits, and any of them may be used.

During the soft start time, the LDO unit 12 is still regulating the output voltage. To prevent the synchronous rectifier 18 from staying on too long and drawing an undesirable reverse current through the inductor 30 during the soft start time (loading down the LDO regulator), a reverse current limiting circuit is employed (such as the zero crossing detector 35 in FIG. 2) to force the synchronous rectifier 18 off during the remainder of the switching cycle.

Referring back to FIG. 7, in step 110 the timer 76 expires.

In step 112, the transition logic circuit 78 controls various switches (e.g., switch 62 in FIG. 4) to reset the LDO unit's bias currents, disable the additional series transistor(s) 65, and disable the LDO unit 12 by removing power to its components.

In step 114, the transition logic circuit resets the reference voltage for the PWM error amplifier 14 to its nominal value. The dual mode regulator is now operating in its normal PWM regulator mode.

The above-described circuitry is only one of many implementation of a dual mode regulator that can practice the invention. Although various circuits are shown directly coupled to other components, such circuits may be coupled to other components through other circuitry, such as resistors, transistors, buffers, diodes, transformers, capacitors, inductors, etc. Any component may be connected in parallel with a similar component for increased current handling. Such parallel components are still referred to herein as a single component.

Having described the invention in detail, those skilled in the art will appreciate that given the present disclosure, modifications may be made to the invention without departing from the spirit and inventive concepts described herein. Therefore, it is not intended that the scope of the invention be limited to the specific embodiments illustrated and described.

What is claimed is:

1. A dual made regulator comprising:
    a switching regulator portion for controlling a duty cycle of a switch to regulate a voltage at an output terminal, the switching regulator portion being controlled to regulate the voltage at the output terminal for load currents exceeding a certain threshold, the switching regulator portion including a first error amplifier receiving a first reference voltage and a voltage feedback signal;
    a linear regulator portion for controlling a series transistor coupled between an input voltage and the output terminal, the linear regulator portion being controlled to regulate the voltage at the output terminal for load currents below a certain threshold, the linear regulator including a second error amplifier receiving a second reference voltage and a voltage feedback signal, the linear regulator portion including at least one bias generator for generating a bias signal wherein increasing a magnitude of the bias signal shortens a response time of the linear regulator when reacting to a change in voltage at the output terminal;
    transition circuitry coupled to the switching regulator portion and the linear regulator portion for operating during a transition between a switching regulator mode and a linear regulator mode, the transition circuitry comprising:
        control circuitry for temporarily raising the first reference voltage during a transition from a linear regulator mode to a switching regulator made, for temporarily raising the second reference voltage during a transition from the switching regulator mode to the linear regulator mode, for temporarily raising the bias signal during a transition from the linear regulator mode to the switching regulator mode and during a transition from the switching regulator mode to the linear regulator mode, and for temporarily augmenting the series transistor for increasing a current handling capacity of the linear regulator portion during a transition from the linear regulator mode to the switching regulator mode and during a transition from the switching regulator mode to the linear regulator mode.

2. The regulator of claim 1 further comprising a timer for establishing a transition period during which the control circuitry raises the first reference voltage, raises the second reference voltage, raises the bias signal, and augments the series transistor.

3. The regulator of claim 2 wherein the timer is further for establishing an end of the transition period during which the control circuitry changes the first reference voltage, the second reference voltage, and the bias signal to nominal operating levels, and disables the augmenting of the series transistor.

4. The regulator of claim 1 wherein the switching regulator portion comprises:
a pulse width modulator (PWM) controller;
at least one switching transistor controlled by the PWM controller;
a smoothing circuit coupled to the switching transistor and the output terminal; and
the first error amplifier generating a signal for controlling a duty cycle of the switching transistor to regulate the voltage at the output terminal.

5. The regulator of claim 1 wherein the control circuitry is also for disabling the switching regulator portion, subsequent to the control circuitry raising the second reference voltage, when the dual mode regulator transitions into the linear regulator mode.

6. The regulator of claim 1 wherein the control circuitry is also for disabling the linear regulator portion, subsequent to the control circuitry raising the first reference voltage, when the dual mode regulator transitions into the switching regulator mode.

7. The regulator of claim 1 further comprising a soft start circuit for temporarily limiting a duty cycle of the switching regulator portion when the dual mode regulator transitions into the switching regulator mode.

8. The regulator of claim 1 further comprising a first reference voltage generator and a second reference voltage generator, the control circuitry for controlling the first reference voltage generator to raise the first reference voltage during a transition from the linear regulator mode to the switching regulator mode, and for controlling the second reference voltage generator to raise the second reference voltage during a transition from the switching regulator mode to the linear regulator mode.

9. The regulator of claim 1 wherein at least one bias generator comprises a current source.

10. The regulator of claim 9 wherein the current source is coupled to a differential amplifier forming part of the second error amplifier.

11. The regulator of claim 1 wherein at least one bias generator is located in a buffer in the linear regulator portion.

12. The regulator of claim 1 further comprising one or more additional transistors controlled by the linear regulator portion, wherein temporarily augmenting the series transistor comprises enabling the one or more additional transistors in parallel with the series transistor.

13. A method for operating a dual mode regulator comprising:
controlling a duty cycle of a switching regulator portion for regulating a voltage at an output terminal for load currents exceeding a certain threshold, the switching regulator including a first error amplifier receiving a first reference voltage and a voltage feedback signal;
controlling a series transistor in a linear regulator portion for regulating a voltage at the output terminal for load currents below a certain threshold, the linear regulator including a second error amplifier receiving a second reference voltage and a voltage feedback signal, the linear regulator portion including at least one bias generator for generating a bias signal wherein increasing a magnitude of the bias signal shortens a response time of the linear regulator when reacting to a change in voltage at the output terminal;
detecting a mode select signal for initiating a transition from a linear regulator mode to a switching regulator mode, or from the switching regulator mode to the linear regulator mode;
temporarily raising the first reference voltage during a transition from the linear regulator mode to the switching regulator mode;
temporarily raising the second reference voltage during a transition from the switching regulator mode to the linear regulator mode;
temporarily raising the bias signal during a transition from the linear regulator mode to the switching regulator mode and during a transition from the switching regulator mode to the linear regulator mode; and
temporarily augmenting the series transistor with one or more additional series transistors for increasing a current handling capacity of the linear regulator portion during a transition from the linear regulator mode to the switching regulator mode and during a transition from the switching regulator mode to the linear regulator mode.

14. The method of claim 13 further comprising disabling the switching regulator portion after raising the second reference voltage during a transition from the switching regulator mode to the linear regulator mode and after raising the bias signal during a transition from the switching regulator mode to the linear regulator mode.

15. The method of claim 14 further comprising resetting the second reference voltage to a nominal value, resetting the bias signal to a nominal value, and disabling the one or more additional series transistors alter the switching regulator portion has been disabled.

16. The method of claim 13 further comprising performing a soft start for temporarily limiting a duty cycle of the switching regulator portion when the dual mode regulator is transitioning into the switching regulator mode.

17. The method of claim 16 further comprising disabling the linear regulator portion after raising the first reference voltage, after raising the bias signal, after augmenting the series transistor, and after performing a soft start during a transition from the linear regulator mode to the switching regulator mode.

18. The method of claim 13 wherein at least one bias generator comprises a current source, and wherein temporarily raising the bias signal comprises increasing a current generated by the current source.

19. The method of claim 18 wherein the current source is coupled to a differential amplifier forming part of the second error amplifier.

20. The method of claim 13 wherein at least one bias generator is located in a buffer in the linear regulator portion.

21. A method for operating a dual mode regulator comprising:

controlling a duty cycle of a switching regulator portion for regulating a voltage at an output terminal for load currents exceeding a certain threshold, the switching regulator including a first error amplifier receiving a first reference voltage and a voltage feedback signal;

controlling a series transistor in a linear regulator portion for regulating a voltage at the output terminal for load currents below a certain threshold, the linear regulator including a second error amplifier receiving a second reference voltage and a voltage feedback signal, the linear regulator portion including at least one bias generator for generating a bias signal wherein increasing a magnitude of the bias signal shortens a response time of the linear regulator when reacting to a change in voltage at the output terminal;

detecting a mode select signal for initiating a transition from a linear regulator mode to a switching regulator mode, or from the switching regulator mode to the linear regulator mode;

temporally raising the first reference voltage during a transition from the linear regulator mode to the switching regulator mode;

temporarily raising the second reference voltage during a transition from the switching regulator mode to the linear regulator mode; and temporarily increasing a reaction speed of the liner regulator portion and temporarily increasing a current handling capacity of the liner regulator portion during a transition from the linear regulator mode to the switching regulator mode and during a transition from the switching regulator mode to the linear regulator mode.

22. A voltage converter comprising:

a switching regulator portion for controlling a duty cycle of at least one switching MOSFET to regulate a voltage at an output terminal, the switching regulator portion being controlled to regulate the voltage at the output terminal for load currents exceeding a certain threshold, the switching regulator portion including a first error amplifier receiving a first reference voltage and a voltage feedback signal;

a linear regulator portion for controlling a series MOSFET coupled between an input voltage and the output terminal, the linear regulator portion being controlled to regulate the voltage at the output terminal for load currents below a certain threshold, the linear regulator including a second error amplifier receiving a second reference voltage and a voltage feedback signal, the series MOSFET being smaller than the switching MOSFET;

transition logic for receiving a signal indicating the onset of a low load current condition and, in response, disabling the switching regulator portion and enabling the linear regulator portion, wherein the switching regulator portion is enabled for a time during which the linear regulator portion is also enabled such that the linear regulator portion takes over regulating the output voltage from the switching regulator portion at a definite time to prevent both the linear regulator and the switching regulator from regulating at the same time;

the transition logic also for receiving a signal indicating the onset of a high load current condition, and, in response, disabling the linear regulator portion and enabling the switching regulator portion, wherein the linear regulator portion is enabled for a time during which the switching regulator portion is also enabled such that the switching regulator portion takes over regulating the output voltage from the linear regulator portion at a definite time to prevent both the linear regulator and the switching regulator from regulating at the same time;

wherein the linear regulator portion is enabled for a time during which the switching regulator portion is also enabled such that the switching regulator portion takes over regulating the output voltage from the linear regulator portion at a definite time to prevent both the linear regulator and the switching regulator from regulating at the same time;

the switching regulator portion, the linear regulator portion, and the transition logic being formed on a single chip.

23. The converter of claim 22 wherein the first reference voltage is different from the second reference voltage.

* * * * *